United States Patent [19]

Hu

[11] Patent Number: 5,129,314
[45] Date of Patent: Jul. 14, 1992

[54] ELECTRIC WOK

[76] Inventor: Loong-Chiang Hu, No. 12, Lane 162, Kuang-Ming Rd., Wu-Jih Hsiang, Taichung Hsien, Taiwan

[21] Appl. No.: 832,415

[22] Filed: Feb. 7, 1992

[51] Int. Cl.⁵ ............... A47J 37/10; H05B 6/12
[52] U.S. Cl. ........................ 99/422; 99/426; 99/451; 99/DIG. 14; 219/10.493; 219/10.75; 219/432; 219/456
[58] Field of Search ............... 99/331, 332, 422, 426, 99/447, 323.5, 403, 451, DIG. 14; 219/10.493, 10.75, 10.79, 10.491, 432, 456, 458, 460, 462, 463

[56] References Cited

U.S. PATENT DOCUMENTS

| | | | |
|---|---|---|---|
| 2,441,941 | 5/1948 | Shafter | 99/323.5 |
| 2,675,458 | 4/1954 | Stiles | 219/460 |
| 3,505,498 | 4/1970 | Shevlin | 219/432 |
| 3,699,874 | 10/1972 | Dusek | 99/323.5 |
| 4,332,188 | 6/1982 | Rhear | 99/427 |
| 4,435,638 | 3/1984 | Simon et al. | 99/426 |
| 4,458,139 | 7/1984 | McClean | 219/462 |
| 4,492,853 | 1/1985 | Lam | 99/403 |
| 4,555,616 | 11/1985 | O'Brien | 219/432 |
| 4,873,921 | 10/1989 | Piane, Sr. | 99/422 |
| 5,032,699 | 7/1991 | Hu | 99/451 |

*Primary Examiner*—Timothy F. Simone
*Attorney, Agent, or Firm*—Winstead Sechrest & Minick

[57] ABSTRACT

An electric wok includes a bowl-shaped pan which has a bottom side with a receiving space and a support frame supporting the bowl-shaped pan. The support frame has an induction coil unit provided with a heat conductive, electric insulating upper plate and an electric insulating lower plate. The induction coil unit is received in the receiving space of the bowl-shaped pan. The induction coil is connected to an external power source. During a cooking operation, a retaining unit engages the bowl-shaped pan to the support frame.

3 Claims, 2 Drawing Sheets

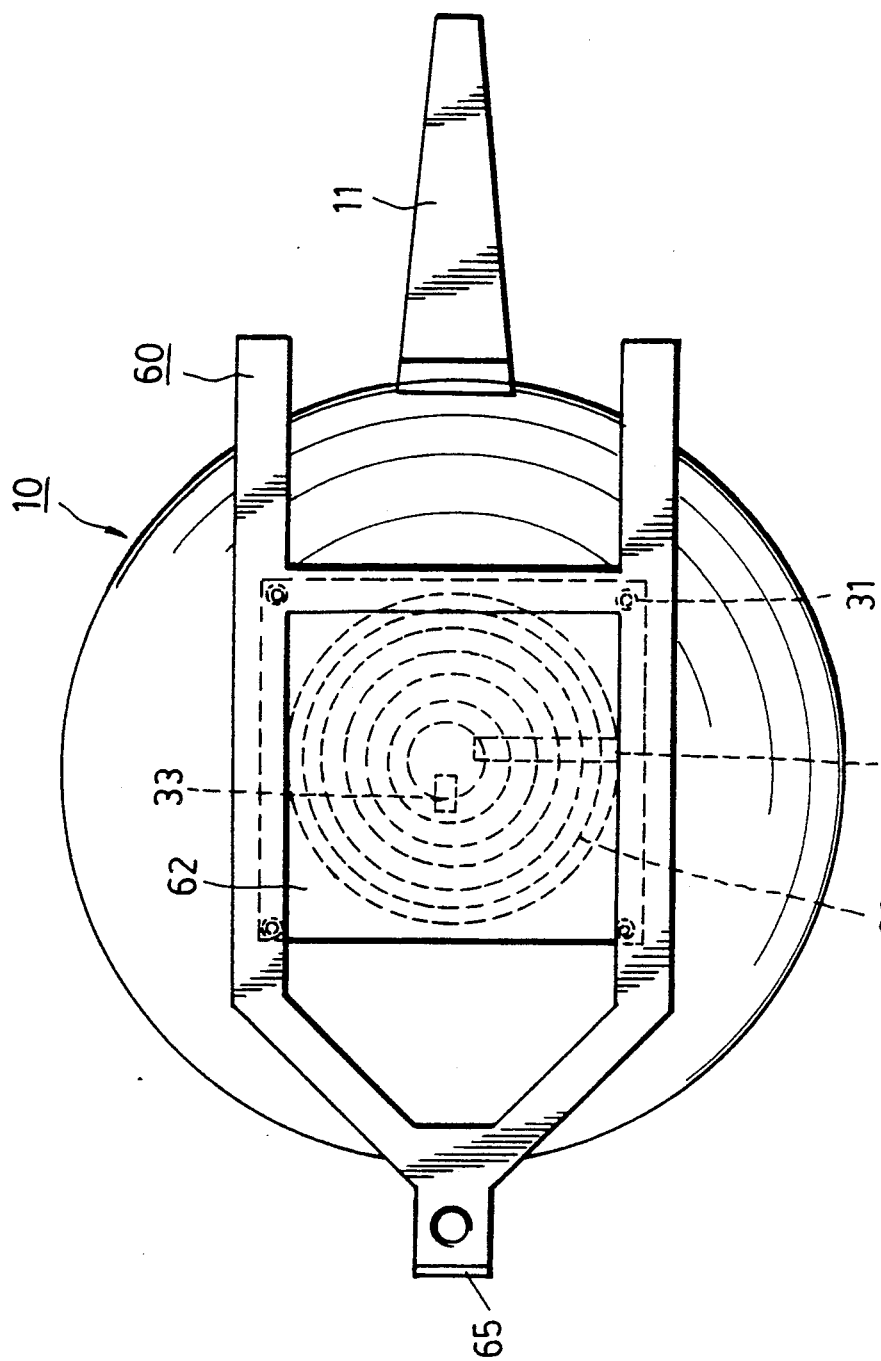

ELECTRIC WOK

BACKGROUND OF THE INVENTION

1. Field of Invention

The invention relates to a cooking wok, more particularly to an electric wok which uses a high temperature induction coil for cooking purposes.

2. Description of the Related Art

In order to cook a food using a conventional wok, the wok must first be put on an electric or a gas stove. In such a situation, the bottom surface of the wok is only 2 mm from the electric stove, putting the bottom surface of the wok in close contact with the stove. Once the distance between the stove and the bottom surface of the wok is altered, the wok's cooking power will decrease 1% from the initial cooking power.

SUMMARY OF THE INVENTION

A main object of the present invention is to provide an electric wok, the cooking efficiency of which will not change regardless of how the wok is handled, i.e., whether or not it is turned or swung during the cooking process.

A conventional wok includes a bowl-shaped pan with a handle portion. According to the present invention, the bowl-shaped pan includes a bottom side provided with a central receiving means. A support means includes an induction coil means provided with a heat conductive, and electric insulating upper plate and a electric insulating lower plate. The upper plate, the induction coil and the lower plate are bound together with the induction coil, and the latter is connected to an external power source. When the bowl-shaped pan is provided on the support means, the support means holds the bowl-shaped pan in a cooking position. In that condition, the bound induction coil is in the receiving means of the bowl-shaped pan, with the upper plate of the same in contact with the bottom side of the bowl-shaped pan. The electric wok also has a retaining means which retains the bowl-shaped pan on the support means during a cooking operation. Since the upper plate is in contact with the bottom side of the bowl-shaped pan, the heat is directly transferred to the bottom side of the bowl-shaped pan, and no heat dissipation occurs.

BRIEF DESCRIPTION OF THE DRAWINGS

Other features and advantages of the present invention will become apparent in the following detailed description, all of which show a non-limiting form of the present invention, and in which:

FIG. 2 shows a bottom view of the electric wok of FIG. 1.

DETAILED DESCRIPTION OF THE PREFERRED EMBODIMENT

Figure 1:
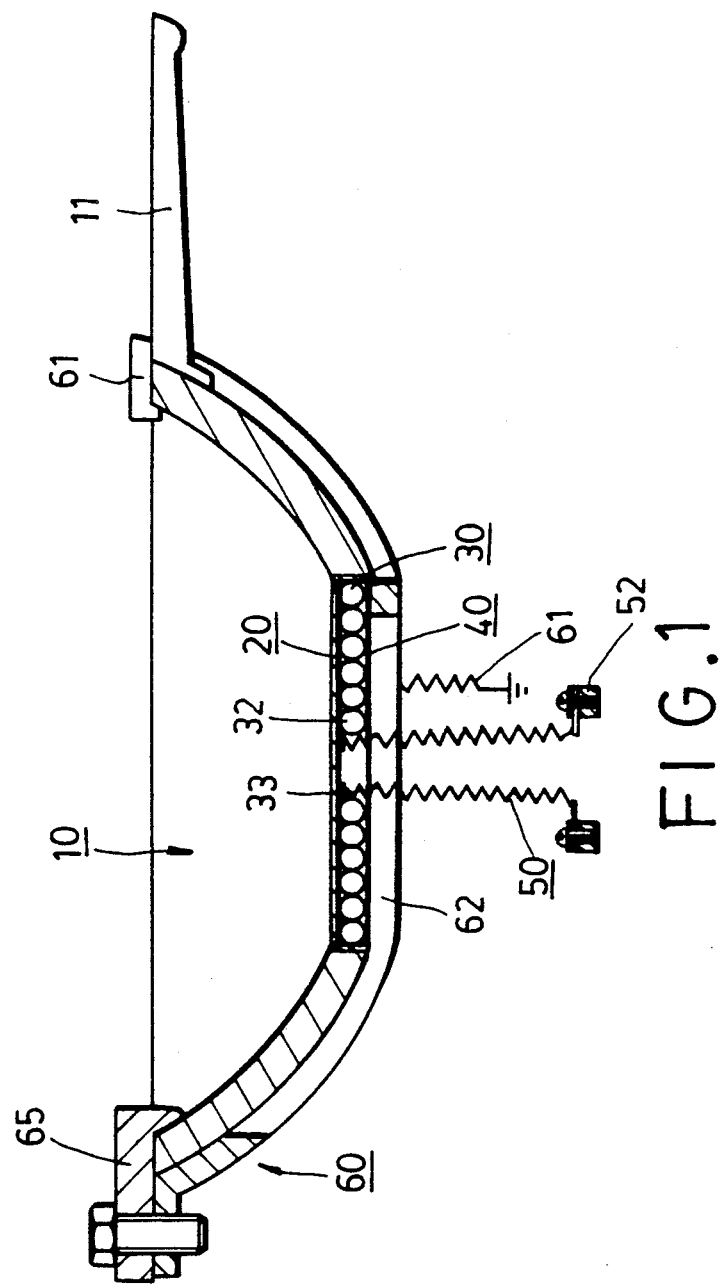
FIG. 1 shows a side view of an electric wok of the present invention.

An electric wok of the present invention includes a bowl-shaped pan (10), a heating means and a support means (60) for holding the bowl-shaped pan in a cooking position.

The bowl-shaped pan (10) in the preferred embodiment has a handle portion (11) and a bottom side provided with a central receiving means.

The support means (60) is a light weight aluminum frame including a high temperature induction coil (30) provided with a heat conductive, electric insulating upper plate (20), such as a mica plate made from mica powder which is forcefully compressed into a plate, and an electric insulating lower plate (40), such as a ceramic plate or a mica plate, under the induction coil. The induction coil (30) has two free ends which are welded to two copper plates (33) which are also provided between the two plates. The copper plates (33) are connected to two coils of connecting wire (50) which have a length of 400 mm, a thickness of 0.4 mm and a width of 30 mm. The connecting wire (50) has a rectangular cross section. The free ends of the connecting wire (50) extend out to connect an external power source (52) which supplies electric power to the induction coil (30).

In order to hold the upper plate, the induction coil and the lower plate together, a high temperature resisting adhesive, such as a silicone adhesive, is applied between the upper and lower plates whereby the three elements are bound upon hardening. A screw means (31) can also be employed for fixing purposes. The induction coil unit is then securely provided on the support means (60) by a known relevant art.

The bowl-shaped pan (10) is provided on the support means (60) in such a manner that the support means (60) holds the bowl-shaped pan in a cooking position. In that situation, the bound induction coil is received in the receiving means of the bowl-shaped pan (10) with the heating conductive plate (20) in contact with the bottom side of the bowl-shaped pan. Thus, the induction coil (30) is always in touch with the upper plate (20).

A retaining means (65, 61) holds the bowl-shaped pan (10) to the support means (60) so that during a cooking operation, the bowl-shaped pan (10) will not disengage from the support means (60). Since the heat conductive upper plate (20) is in touch with the bottom side of the bowl-shaped pan (10), the heat is directly transferred to the bowl-shaped pan (10) and there is no heat dissipation during cooking.

In case the bowl-shaped pan needs to be cleaned, it can be removed when the retaining members are loosened from the support frame. At that time, the bounded induction coil is left on the support means (60).

When fixing the bounded induction coil on the support means, any conventional relevant art can be applied.

With the invention thus explained, it is obvious to those skilled in the art that various modifications and variations can be made without departing from the scope and spirit of the present invention. It is therefore intended that this invention be limited only as in the appended claims.

I claim:

1. An electric wok including a bowl-shaped pan with a hand grip portion;
   characterized in that said bowl-shaped pan has a bottom side provided with a central receiving means;
   a support means having an induction coil provided with a heat conductive, electric insulating upper plate thereon and an electric insulating lower plate under said induction coil;
   means for holding said upper plate, said induction coil and said lower plate together;
   said support means supporting said bowl-shaped pan in a cooking position with said upper plate, said induction coil and said lower plate disposed in said receiving means with said upper plate being in contact with said bottom side of said bowl-shaped pan;

means for retaining said bowl-shaped pan to said support means during a cooking operation; and
an external power source electrically connected to said induction coil.

2. An electric wok as claimed in claim 1, wherein said induction coil has two free ends connected to two copper plates provided between said upper and lower plates, said two copper plates connected to two electric conducting wires, each of which extends out of said receiving means to connect to said external power source.

3. An electric wok as claimed in claim 1, wherein said heat conductive, electric insulating upper plate is a mica plate.

* * * * *